No. 689,455.   J. H. BICKFORD.   Patented Dec. 24, 1901.
PIPE COUPLING.
(Application filed Jan. 28, 1901.)
(No Model.)
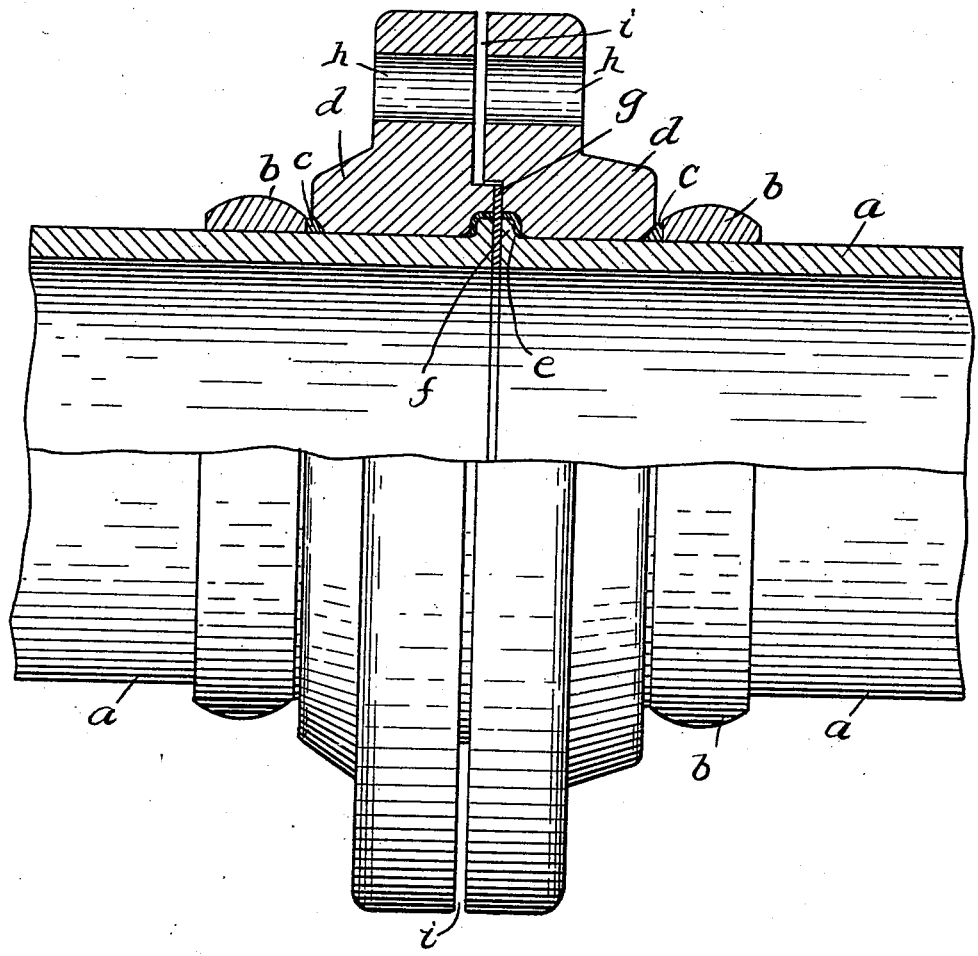

UNITED STATES PATENT OFFICE.

JOHN H. BICKFORD, OF SALEM, MASSACHUSETTS.

PIPE-COUPLING.

SPECIFICATION forming part of Letters Patent No. 689,455, dated December 24, 1901.

Application filed January 28, 1901. Serial No. 45,115. (No model.)

*To all whom it may concern:*

Be it known that I, JOHN H. BICKFORD, of Salem, in the county of Essex and State of Massachusetts, have invented an Improvement in Pipe-Couplings, of which the following description, in connection with the accompanying drawing, is a specification, like letters on the drawing representing like parts.

My invention relates to pipe joints or couplings in which cast or wrought metal flanges are secured to wrought-metal tubes without threads, and the principal use for this invention is in connection with steam-pipes or mains carrying high pressure.

It is a well-known fact that in stationary steam plants like electric-lighting and electric-railway stations and also in some mills the tendency has been from time to time to raise the initial steam-pressure per square inch until it has become excessive. In so doing it has been found that the usual method of making up the carrying-pipes—viz., putting the sections together with threaded couplings or flanges—is ineffectual, and leaks occur even in the best-prepared work.

In cases where threaded joints have been used it has been necessary to increase the thickness of the pipes very materially—in many cases one hundred per cent.—in order to get the required size and taper of thread. This extra thickness of pipe is not necessary to insure the safe carrying of the steam, but solely to provide sufficient metal to cut a proper thread. Under such circumstances the cost of the work is excessive on account of the extra cost of the pipe.

I am aware that attempts have been made to use flanges without threads by casting them upon the pipes, welding them upon the pipes, rolling the pipes into grooves on the interior of the flanges, &c.; but, like the threaded joint on extra-thick pipe, the cost is excessive. I am also aware that means have been provided around the pipes and in the rear of the flanges for the purpose of stopping leaks between the flanges and the exterior surface of the pipes; but in all instances known to me the cost is excessive, especially on pipes of large diameter; also, in most instances such means were designed to be placed upon the pipes after their erection and in case leaks appeared after being in service for a while.

The object of my invention is to construct a joint which can be used, if desired, with pipes of standard thicknesses and the flanges so placed upon the pipes that threads will be dispensed with, yet an absolutely tight and substantial joint formed, and the whole to be moderate in cost as compared with the present work.

A further object of my invention is to provide means for stopping a leak should one occur after the pipes have been in service without it being necessary to open the joint or incur any additional expense.

The drawing shows a longitudinal section and partial elevation of a pipe-coupling embodying this invention.

In carrying out my invention I first dress the outer surface of the ends of the wrought-metal pipes $a$ to a uniform diameter as far as desired. A ring $b$, which is preferably of wrought-iron or steel, is then turned to a uniform diameter on its inside, such diameter being slightly smaller than the finished diameter of the pipe. It is then heated, expanding slightly, and while heated is pressed or forced upon the pipe to the position shown in the drawing, where it cools and shrinks tightly upon the pipe, remaining there permanently. In practice I have found that this ring may be pressed onto the pipe cold and serve the same purpose, although in such case it (the ring) must be of larger cross-section to avoid breaking. Therefore it is preferable to shrink it on, as described. After the ring $b$ has been fixed to the pipe $a$ ductile metal ring $c$, made to roughly fit the pipe, is slipped over the end of the pipe and up against the ring $b$. This ring is preferably made of copper, or it may be soft iron or any other ductile metal that is capable of being compressed into any desired shape or calked. A flange $d$, preferably of cast metal, like iron or steel, or it may be wrought metal pressed into the desired shape, after having been turned on the inside to a uniform diameter, which diameter is a little less than that of the pipe, is preferably pressed upon the pipe by hydraulic or other pressure, or it may be heated, expanded slightly, and then forced upon the pipe and allowed to shrink in place. This flange $d$ is forced upon the pipe until it stops against the ductile metal ring $c$. The back side of the flange $d$ is or may be beveled inwardly or undercut.

The ring $c$ is not depended upon to form a steam-tight joint between the flange $d$ and pipe $a$ when it is first put on; but it forms the means of stopping a leak temporarily by calking it under the bevel on the back of the flange $d$ and against the face of the ring $b$ should such a leak occur after the pipe is in service. I am aware that rings have been placed upon pipes back of flanges to serve as a packing, but not in the manner and for the purpose I have shown and described.

In the abutting face of the flange $d$ and next to the outer surface of the pipe an annular groove or recess is cut, into which is fitted a ductile metal ring $e$, said ring protruding slightly beyond the face of the flange when first put in place, and its inner diameter is such as to fit upon the pipe $a$.

In forcing the flange $d$ upon the pipe $a$ the latter protrudes from the face of the flange a short distance. The end of the pipe $a$ is then upset, and the annular flange $f$, formed by upsetting, is forced into the annular groove or recess in the flange $d$ and against the ring $e$, compressing the latter against the walls of the said annular groove. The ring $e$, or that portion of it projecting beyond the face of the flange $d$, is then calked against the combined surfaces of the flange $d$ and the flange $f$, formed on the pipe $a$, until a steam-tight joint is produced. The assembled parts are then put in a lathe and turned to a true face, against which a metal gasket $g$ rests.

The flanges $d\,d$ are held together with bolts placed in the holes $h$. A space $i$ is left between the flanges $d\,d$, so that the metal gasket $g$ will be firmly impinged, which, as it will be seen, covers the exposed ends of the ductile metal rings $e$ of both parts. It will therefore be seen that the gasket $g$ and ring $e$ serve as primary or permanent means of making the joint between the flange $d$ and the outer surface of the pipe steam-tight, while the ring $c$, calked in place at the time a leak occurs, serves as a temporary means for stopping the leak or until the joint can be uncoupled and the ring $e$ recalked, which can be done effectually and inexpensively.

Ordinarily the steam-pipes are covered with asbestos or other non-conducting material, which if carried close up to the back side of flange $d$ will prevent the introduction of a tool to calk the ring $c$; but herein it will be seen that said ring $c$ is at all times accessible for the purpose of being calked.

I claim—

1. In a pipe-coupling, the combination of a pipe $a$ and flange $d$ fixed thereon having an annular recess in its abutting face adjacent the pipe, a ductile metal ring $e$ contained in said recess, and a flange $f$ on the end of the pipe $a$ upset into said annular recess, and a gasket $g$ covering the exposed end of said ring $e$, substantially as described.

2. In a pipe-coupling, the combination of the pipe $a$, ring $b$ fixed thereon, flange $d$ also fixed thereon, and a ductile metal ring $c$ calked in place between said fixed ring and flange, substantially as described.

3. In a pipe-coupling, the combination of the pipe $a$ and flange $d$ fixed thereon having an annular recess in its abutting face adjacent the pipe, a ductile metal ring $e$ contained in said recess, a flange $f$ on the end of the pipe $a$ upset into said annular recess and thereby impinged upon said ring $e$, the ring $b$ also fixed on the pipe and a ductile metal ring $c$ disposed between said fixed ring and flange, substantially as described.

In testimony whereof I have signed my name to this specification in the presence of two subscribing witnesses.

JOHN H. BICKFORD.

Witnesses:
 B. J. NOYES,
 JOHN W. DECROW.